United States Patent [19]

Spence

[11] 3,924,247

[45] Dec. 2, 1975

[54] DRIVER CELL WITH MEMORY AND SHIFT CAPABILITY

[75] Inventor: John R. Spence, Villa Park, Calif.

[73] Assignee: Rockwell International Corporation, El Segundo, Calif.

[22] Filed: Aug. 21, 1974

[21] Appl. No.: 499,252

[52] U.S. Cl. ....... 340/173 CA; 307/221 R; 307/238

[51] Int. Cl.² .................. G11C 11/24; G11C 19/18

[58] Field of Search ... 340/173 CA, 173 R, 174 SR; 307/238, 221 R, 246

[56] References Cited

UNITED STATES PATENTS

| | | | |
|---|---|---|---|
| 3,151,314 | 9/1964 | Root et al. | 340/173 R |
| 3,760,368 | 9/1973 | Dailey et al. | 340/173 AM |

OTHER PUBLICATIONS

Goth, Static FET Shift Register, IBM Technical Disclosure Bulletin, Vol. 13, No. 2, 7/70, pp. 308–309.

Repchick, Self-Looping Shift Register Cell, IBM Technical Disclosure Bulletin, Vol. 12, No. 12, 5/70, pp. 2084–2085.

Shen, Two-Way Four-Phase MOSFET Dynamic Shift Register, IBM Technical Disclosure Bulletin, Vol. 12, No. 12, 5/70, p. 2149.

*Primary Examiner*—Stuart N. Hecker
*Attorney, Agent, or Firm*—H. Fredrick Hamann; G. Donald Weber, Jr.; Morland C. Fischer

[57] ABSTRACT

A circuit including a memory cell which has both memory and shift capabilities. The circuit may operate as a driver circuit which can store information in a memory cell or feed-forward information in order to shift information or data from one cell to another.

A driver function is associated with the circuit wherein the data or information shifted from one cell to another is not diminished or deteriorated.

11 Claims, 1 Drawing Figure

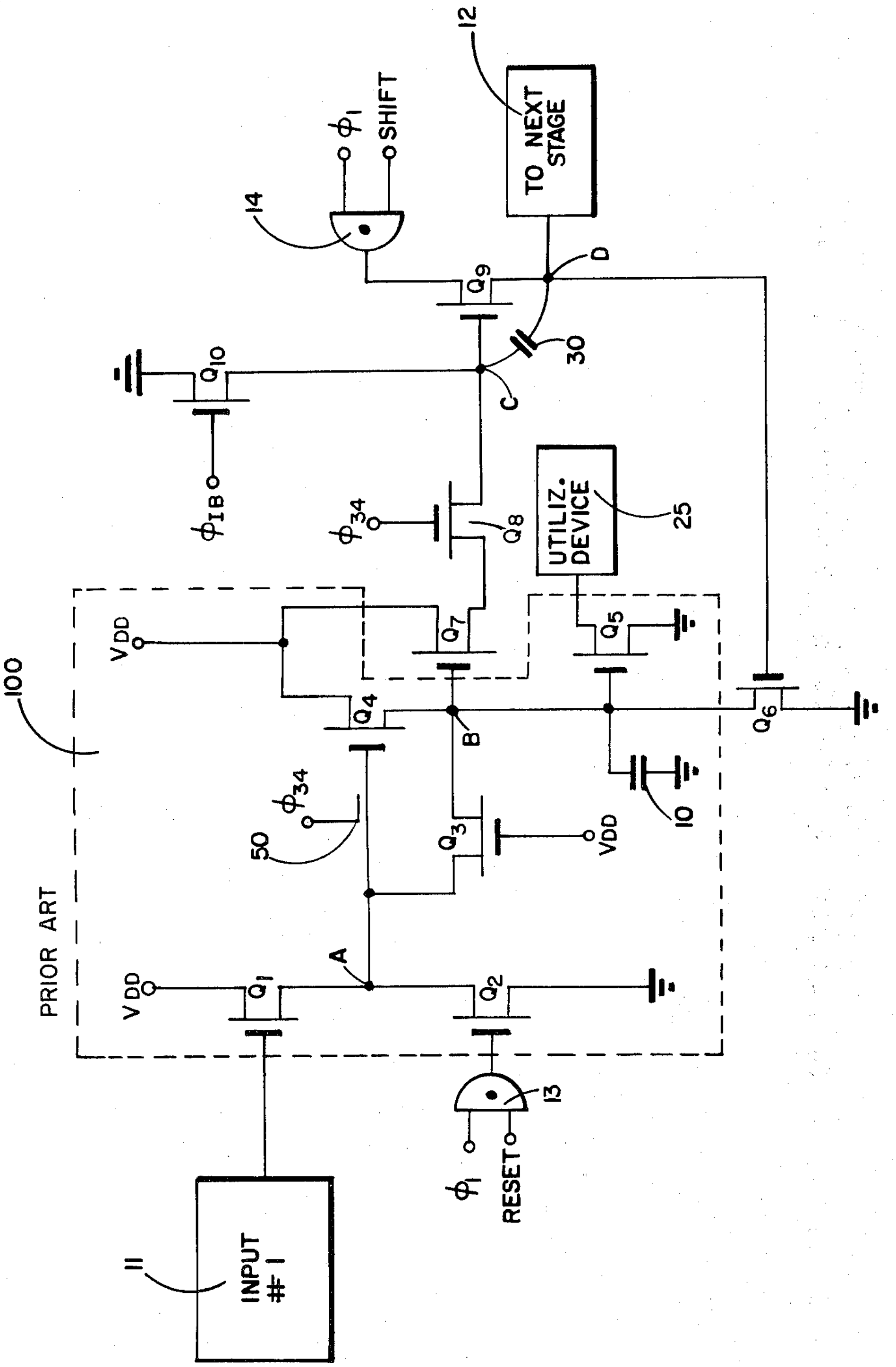
PRIOR ART
INPUT #1
TO NEXT STAGE
UTILIZ. DEVICE
RESET
SHIFT
VDD
A
B
C
D
100
50
10
11
12
13
14
25
30

DRIVER CELL WITH MEMORY AND SHIFT CAPABILITY

BACKGROUND

1. Field of the Invention

The invention relates to a driver circuit which has static hold (i.e. memory) as well as shift capability.

2. Prior Art and Cross-references

There are many known memory cells and driver circuits known in the art. Typical memory cells are shown and described in several U.S. patents, for example Two Clock Memory Cell, U.S. Pat. No. 3,744,037, of Spence; Memory Circuit Using Storage Capacitance and Field Effect Devices, U.S. Pat. No. 3,576,571, Booher; and Read/Write Memory Circuit, U.S. Pat. No. 3,581,292, Polkinghorn. In addition, driver circuits of many types are known in the art. So many driver circuits are known, that any listing of typical patents would be extremely extensive and is omitted here.

In the art known to date, especially in four phase circuitry, shift and hold circuits have usually been provided in the form of a flip flop circuit. A DC driver controlled by the flip flop is used to drive output circuits. Generally, this type of circuitry requires utilization of large areas in integrated circuits such as the LSI type. It is desirable in most MOS/LSI applications that the complexity of the circuit be reduced in order to reduce the chip area which is required.

SUMMARY OF THE INVENTION

A driver circuit with memory and shift capability is provided. The circuit includes a storage or memory cell. A feed-forward driver or bootstrap circuit is connected to the cell and operates to shift the information from one cell to another. A separate output driver is utilized to drive a utilization device.

BRIEF DESCRIPTION OF THE DRAWINGS

The single FIGURE is a partially block, partially schematic diagram of a driver cell as embodied in the instant invention.

DESCRIPTION OF THE PREFERRED EMBODIMENT

Referring now to the single FIGURE, there is shown a diagram of a preferred embodiment of the instant invention. In describing this embodiment, reference is made to a circuit having four phase clock operation. However, other clocking arrangements can be utilized.

In the drawing, transistors Q1–Q5 (each of which may be a suitable field effect transistor such as PMOS, NMOS or the like) are part of the standard memory cell circuit which has been previously described in the aforementioned prior art patents. The conduction paths of transistors Q1 and Q2 are connected in series between a source $V_{DD}$ and a suitable reference potential, for example ground. The control electrode of transistor Q1 is connected to a suitable input device 11 which may represent a prior stage in a register containing additional stages similar to those depicted schematically in the FIGURE. In addition, the control electrode of transistor Q2 is connected to the output terminal of AND gate 13. The input terminals of AND gate 13 receive the clock signal 01 and the RESET signal which are supplied by other circuits external to the circuit depicted herein. The external circuits are circuits which may be known in the art and are not shown or described herein in detail. These external circuits may comprise any suitable control device such as a calculator chip or the like.

Node A, a common junction between the conduction paths of transistors Q1 and Q2, is connected to one terminal of one plate of SMOC device 50 as well as to one terminal of the conduction path of transistor Q3. (For a discussion of SMOC devices, reference is made to U.S. Pat. No. 3,591,816, R. K. Booher, entitled Field Effect Conditionally Switched Capacitor.) The other plate or control electrode of SMOC device 50 is connected to the aforesaid external circuitry which supplies clock signals 034, i.e. clock phases 03 and 04. The control electrode of transistor Q3 is connected to source $V_{DD}$. Transistor Q4 has one terminal of the conduction path thereof connected to source $V_{DD}$ and the other terminal connected to the second terminal of the conduction path of transistor Q3 at node B. The control electrode of transistor Q4 is connected to the first plate of SMOC device 50.

Node B is also connected to the control electrodes of transistors Q7, Q5, one terminal of the conduction path of Q6, and to one terminal of capacitor 10. A second terminal of capacitor 10, and a second terminal of the conduction path of transistor Q6 are connected to ground along with one terminal of the conduction path of transistor Q5. The other terminal of the conduction path of transistor Q5 is connected to a utilization device 25. This utilization device may be a keyboard or the like. The conduction path of transistor Q7 is connected in series with the conduction path of transistor Q8. The series connected conduction paths are connected from source $V_{DD}$ to node C. The control electrode of transistor Q8 is connected to the external circuitry to receive clock signal 034.

Transistor Q10 has the conduction path thereof connected between a suitable reference potential, for example ground and node C. The control electrode of transistor Q10 is connected to receive a signal 0IB. This signal is a so-called "inbetween" signal which is generated periodically during the clock signals by the external circuitry. Typically, the 0IB signal is generated between the 02 and 03 portions of the clock signal.

Node C is further connected to the control electrode of transistor Q9. The conduction path of transistor Q9 is connected between the output terminal of AND gate 14 and the control electrode of transistor Q6 (at node D). AND gate 14 receives input signals 01 and SHIFT from the external circuitry noted supra. Also, at the connection between transistors Q9 and Q6, node D may serve as the output node for forming a connection with a succeeding stage similar to the stage shown in this FIGURE if such succeeding stage is desired. If the stage shown is the last stage in the series, node D serves only as a junction between transistors Q9 and Q6 with no external connection to a succeeding stage.

Capacitor 30 is connected between nodes C and D. This capacitor may be a discrete capacitor built into the circuit device. In the alternative, capacitor 30 may represent capacitance which is inherent in MOS/LSI circuit structures. Capacitor 30 and transistor Q9 operate as a bootstrap circuit.

In operation, the memory cell 100 operates in a standard fashion known in the prior art for which a detailed description is not necessary herein. New data is supplied to the circuit by means of input device 11 via transistor Q1. That is, the signal at node A reflects the input signal from input 11. For example, if transistor Q1 is turned on by the application of a binary one at input 11, node A receives the signal $V_{DD}$ (less a threshold voltage Vt). Conversely, if transistor Q1 is rendered nonconductive by the application of a binary zero by input 11, node A will remain at ground potential to which it has been switched when AND gate 13 was energized to drive transistor Q2 on. The signal at node A is applied to node B via operation of transistors Q3, SMOC device 50 and transistor Q4. The signal at node B is recirculated through the memory cell 100 at clock time 034 by operation of SMOC device 50 as is known in the art.

The signal at node B is also applied to utilization device 25 by means of output driver transistor Q5. That is, if a binary one is supplied to the control electrode of transistor Q5, utilization device 25 is connected to ground. Conversely, if a binary zero is supplied to transistor Q5, utilization device 25 is not shorted to ground. Incidentally, transistor Q5 is designed in this application to operate as a driver circuit to apply a relatively large signal to utility device 25 without loading the cell.

Furthermore, the signal at node B is applied to transistor Q7 to control operation thereof. If a binary one signal is applied, transistor Q7 is rendered conductive whereby, during the application of clock signal 034, transistor Q8 is also conductive and source $V_{DD}$ is connected to node C. Conversely, if a binary zero is applied at node B, transistor Q7 is rendered nonconductive wherein node C is not connected to source $V_{DD}$ at clock time 034. The signal at node C will permit transistor Q9 to boost and apply a binary one signal to the next cell when the 01 and SHIFT signals are concurrently applied to gate 14. Thus, in response to the application of a binary one signal at node C, a potential representative of a binary one signal is applied at node D via capacitor 30. The concurrent application of a 01 signal and a SHIFT signal to the input terminals of AND gate 14 produces a signal which approximates a binary one at the output terminal of gate 14. When a binary one signal is applied to node C, the binary one signal at node D is added to the signal from gate 14 whereby a boosted signal is produced at node D. Thus, it is assured that a binary one signal will be transferred to the next stage if such stage exists. Concurrently, the boosted signal will be applied to the control electrode of transistor Q6 to render same conductive. When transistor Q6 is rendered conductive, node B is clamped to ground potential wherein the binary one level of information in cell 100 (the cell from which information is being transferred) is essentially cleared. Of course, if a binary zero had existed in the cell or if a SHIFT signal had not occurred, transistor Q9 would not have boosted the signal at node D and a binary zero would be produced at node D.

Transistor Q10 is provided in order that the information at node C can be periodically cleared to zero. That is, the signal 0IB is a signal which occurs during each clock signal. With the application of the 0IB signal, transistor Q10 is rendered conductive and clamps node C to ground. This device is desirable in order to clear the circuit to zero during each clock cycle. This prevents the accumulation of binary ones in the memory cells. That is, the binary one would be transmitted from node B to node C. Without some means for clearing the cell, ultimately all cells would store binary ones therein and the circuit would not function properly.

Thus, there has been shown and described a preferred embodiment of the instant invention. Those skilled in the art may contemplate modifications and changes to the circuit described herein. For example, positive or negative logic could be equally well utilized. However, the various voltage polarities would possibly have to be altered. Moreover, PMOS, NMOS or even CMOS circuitry can be utilized. Of course, a clocking system using other than four phase signals may be incorporated as well. Any modifications or changes which are suggested to those skilled in the art are intended to be included in the purview of this invention. The scope of the invention is limited only by the claims appended hereto.

Having thus described the invention, what is claimed is:

1. In combination, memory cell means, source means for supplying at least one reference potential, input means connected to said memory cell means to supply input signals thereto, first output means connected to said memory cell means to drive a utilization device, second output means connected to said memory cell means, and feedback means connected from said memory cell to said source means to selectively supply said at least one reference potential to said memory cell to thereby clear said memory cell, said second output means connected to said feedback means to control the conductivity thereof.

2. The combination recited in claim 1 wherein said first output means comprises a plurality of transistor means.

3. The combination recited in claim 1 wherein said first and second output means are connected to a common point in said memory cell and said feedback means is returned to said common point.

4. The combination recited in claim 1 including additional input means connected to said memory cell, said additional input means comprising at least one transmission gate connected to a source of input data to be supplied to said memory cell, and at least one reset gate means for selectively resetting the input data to a predetermined condition.

5. The combination recited in claim 1 including clamping means selectively connected to said second output means for clamping said second output means to a prescribed condition to thereby clear said second output means.

6. The combination recited in claim 1 wherein said feedback means includes gate means having a conduction path thereof connected between said memory cell means and said source means and a control electrode thereof connected to said second output means.

7. The combination recited in claim 1 said second output means comprising a plurality of signal gating means, a first of said signal gating means selectively operated during a first portion of an operating cycle to transmit an output signal from said memory cell, said first signal gating means connected to a second of said signal gating means to selectively control the operation thereof, a third of said signal gating means selectively connected from said source means to said feedback means during a second portion of said operating cycle via a conduction path of said second signal gating means to control the conduction of said feedback means, and a fourth of said signal gating means selectively connected to said source means for selectively clamping said second output means to said at least one reference potential during an interval between said first and second portions of said operating cycle.

8. The combination recited in claim 1 wherein said second output means includes selectively operated first gate means for selectively transmitting an output signal from said memory cell.

9. The combination recited in claim 8 including capacitance means connected between said first gate means and said feedback means to supply said transmitted output signal from said memory cell to said feedback means to control the conduction of said feedback means.

10. The combination recited in claim 8, said second output means further including second gate means connected to said feedback means and selectively operated by said output signal transmitted by said first gate means for controlling the conduction of said feedback means.

11. The combination recited in claim 10 including transmission gate means selectively connected from said source means to said feedback means via a conduction path of said second gate means so as to supply said at least one reference potential to said feedback means to control the conduction thereof.

* * * * *